(12) United States Patent
Chatani (10) Patent No.: US 9,053,105 B2
(45) Date of Patent: Jun. 9, 2015

(54) INFORMATION SEARCH METHOD, INFORMATION SEARCH SERVER, AND INFORMATION SEARCH SYSTEM FOR PROVIDING CONTENT BASED ON CURRENT PROGRESS STATUS OF CONTENT

(75) Inventor: Masayuki Chatani, Tokyo (JP)

(73) Assignees: SONY CORPORATION, Tokyo (JP); SONY COMPUTER ENTERTAINMENT INC., Tokyo (JP)

(*) Notice: Subject to any disclaimer, the term of this patent is extended or adjusted under 35 U.S.C. 154(b) by 307 days.

(21) Appl. No.: 13/607,930

(22) Filed: Sep. 10, 2012

(65) Prior Publication Data

US 2012/0331112 A1     Dec. 27, 2012

Related U.S. Application Data

(63) Continuation of application No. PCT/JP2011/000883, filed on Feb. 17, 2011.

(30) Foreign Application Priority Data

Apr. 14, 2010   (JP) ................................. 2010-093516

(51) Int. Cl.
G06F 15/16       (2006.01)
G06F 17/30       (2006.01)
(Continued)

(52) U.S. Cl.
CPC ........ G06F 17/30029 (2013.01); H04N 21/254 (2013.01); H04N 21/25816 (2013.01); H04N 21/4325 (2013.01); H04N 21/4781 (2013.01); H04N 21/6581 (2013.01)

(58) Field of Classification Search
CPC .......... H04N 21/4325; H04N 21/4781; H04N 21/6581; G06F 17/30
USPC ................................. 709/202–203, 217–219
See application file for complete search history.

(56) References Cited

U.S. PATENT DOCUMENTS 6,021,185 A      2/2000 Staron
7,448,080 B2 *  11/2008 Karjala et al. ................ 709/223
(Continued)

FOREIGN PATENT DOCUMENTS

CN     101193200     6/2008
CN     101535995     9/2009
(Continued)

OTHER PUBLICATIONS

Notification of Reason(s) for Refusal dated Sep. 10, 2013, from corresponding Japanese Application No. 2010-093516.
(Continued)

Primary Examiner — Bharat N Barot
(74) Attorney, Agent, or Firm — Katten Muchin Rosenman LLP (57) ABSTRACT

In an information search server 600, a database includes a table storing a progress status of content, and information related to the content at the progress status, and a table storing user information with respect to a content playback apparatus, an identifier of the content playback apparatus, and an identifier of a terminal apparatus that differs from the content playback apparatus. A connecting user management unit manages user information with respect to the content playback apparatus connected to the information search server. A related information acquisition unit acquires a current progress status of content being played back on the content playback apparatus, and acquires information related to the content at the current progress status. A connecting user management unit identifies a terminal apparatus that differs from the content playback apparatus, and the related information acquisition unit transmits the related information to the terminal apparatus.

5 Claims, 6 Drawing Sheets

(51) Int. Cl.
*H04N 21/254* (2011.01)
*H04N 21/258* (2011.01)
*H04N 21/432* (2011.01)
*H04N 21/478* (2011.01)
*H04N 21/658* (2011.01)

(56) References Cited

U.S. PATENT DOCUMENTS

| | | | |
|---|---|---|---|
| 7,558,820 B2 | 7/2009 | Kimoto et al. | |
| 2007/0261538 A1* | 11/2007 | Takai et al. | 84/612 |
| 2008/0066107 A1 | 3/2008 | Moonka et al. | |
| 2011/0125585 A1* | 5/2011 | Dow et al. | 709/217 |
| 2011/0307549 A1* | 12/2011 | Motsinger | 709/203 |
| 2012/0185574 A1* | 7/2012 | Cho et al. | 709/219 |
| 2013/0211912 A1* | 8/2013 | Kim et al. | 705/14.53 |

FOREIGN PATENT DOCUMENTS

| | | |
|---|---|---|
| CN | 101578619 | 11/2009 |
| CN | 101615961 | 12/2009 |
| JP | 7-162818 | 6/1995 |
| JP | 11-196345 | 7/1999 |
| JP | 2002-366418 | 12/2002 |
| JP | 2003-58395 | 2/2003 |
| JP | 2004-302231 | 10/2004 |
| JP | 2005-39625 | 2/2005 |
| JP | 2006-288528 | 10/2006 |
| JP | 2009-207718 | 9/2009 |
| JP | 2009-233104 | 10/2009 |
| WO | 2008/084893 | 7/2008 |

OTHER PUBLICATIONS

International Search Report dated Apr. 12, 2011, from corresponding International Application No. PCT/JP2011/000883.
International Preliminary Report on Patentability and Written Opinion of the International Searching Authority dated Nov. 6, 2012 from corresponding International Application No. PCT/JP2011/000883.
Decision of Refusal dated Jan. 28, 2014, from corresponding Japanese Application No. 2010-093516.
Chinese First Office Action dated Nov. 24, 2014 from corresponding Application No. 201180018348.8.

* cited by examiner

| PROGRESS STATUS 1 | http://www.xxx.com/xxx/xxxxx |
|---|---|
| PROGRESS STATUS 2 | http://www.yyy.net/yyy/yyyyy |
| ⋮ | ⋮ |
| PROGRESS STATUS N | https://www.zzz.jp/zzz/zzzzz |

| USER ID | XXXXX |
|---|---|
| USER NAME | XXXXX |
| PASSWORD | XXXXXXXX |
| E-MAIL ADDRESS | XXX@XXX.XXX |
| CELLULAR PHONE TERMINAL 1 | XXX-XXXX-XXXX |
| CELLULAR PHONE TERMINAL 2 | XXX-XXXX-XXXX |
| ⋮ | ⋮ |
| CELLULAR PHONE TERMINAL N | XXX-XXXX-XXXX |
| FRIEND 1 | USER ID XXXXX |
| FRIEND 2 | USER ID XXXXX |
| ⋮ | ⋮ |
| FRIEND N | USER ID XXXXX |

INFORMATION SEARCH METHOD, INFORMATION SEARCH SERVER, AND INFORMATION SEARCH SYSTEM FOR PROVIDING CONTENT BASED ON CURRENT PROGRESS STATUS OF CONTENT

BACKGROUND OF THE INVENTION

1. Field of the Invention

The present invention relates to an information search server, an information search method using the information search server, and an information search system using a network.

2. Description of the Related Art

Consequent upon the popularization of network infrastructure such as the Internet, such network infrastructure leads to a user becoming able to search for information related to content such as games, music, movies, and so forth, in a simple manner. When the user is to search for such information, in many cases, the user inputs a keyword to a search engine executed on a terminal such as a PC (Personal Computer), a content playback apparatus, or the like, connected to a network, so as to acquire information. Alternatively, in some cases, the user establishes a connection to a predetermined server using a user ID, password, or the like, so as to acquire such information (see Patent document 1).

RELATED ART DOCUMENTS

Patent Documents

[patent document 1]
Japanese Patent Application Laid Open No. 2003-58395 (which corresponds to U.S. Pat. No. 7,558,820)

When the user searches for related information on a content playback apparatus which is playing back content, the user must perform such a search operation on the same screen as that on which the content being played back is displayed. In this case, there is a need to provide a display area which allows the user to search for the related information while the content is being played back with a reduced size. Otherwise, there is a need to display such a display area such that it is overlaid upon the content which is being played back. In either case, such a display area interferes with the content which is being played back.

When the user searches for related information using a terminal apparatus that is different from the content playback apparatus which is playing back the content, the user must operate this terminal apparatus while the user turns away from the content which is being played back. In a case in which the content being played back is a game, in some cases, it is difficult to temporarily stop the content. Thus, in this case, it is difficult for the user to search for the information in a real time manner when the content is being played back.

SUMMARY OF THE INVENTION

The present invention has been made in order to solve such a problem. Accordingly, it is a general purpose of the present invention to provide a technique for allowing the user to browse the related information without suspending playback of the content, and without interfering with the content which is being played back.

In order to solve the aforementioned problem, an embodiment of the present invention relates to an information search server. The information search server comprises: a database including a table storing a progress status of content and information related to the content at the current progress status in a mutually associated manner, and a table storing user information with respect to a content playback apparatus, an identifier of the content playback apparatus, and an identifier of a terminal apparatus which differs from the content playback apparatus, in a mutually associated manner; a connecting user management unit configured to manage the user information with respect to the content playback apparatus connected to the information search server; and a related information acquisition unit configured to acquire, via a network, the progress status of content which is being played back on the content playback apparatus, and to search the database so as to acquire related information that corresponds to the content at the progress status which is being played back on the content playback apparatus. The connecting user management unit is configured to search the database so as to identify the terminal apparatus which is connected to the information search server, and which differs from the content playback apparatus. The related information acquisition unit is configured to transmit the related information to the terminal apparatus identified by the connecting user management unit.

Another embodiment of the present invention relates to an information search system. The information search system comprises: a database including a table storing a progress status of content and information related to the content at the progress status in a mutually associated manner, and a table storing user information with respect to a content playback apparatus, an identifier of the content playback apparatus, and an identifier of a terminal apparatus which differs from the content playback apparatus, in a mutually associated manner; a server which can be connected to the database; and a content playback apparatus which can be connected to the server via a network. The server is configured to authenticate, with reference to the database, the propriety of a request from the content playback apparatus to establish a connection to the server via the network. When the connection authentication by the server is successful, the content playback apparatus is configured to transmit, to the server, the current progress status of the content which is being played back on the content playback apparatus. The server is configured to search the database so as to acquire related information that corresponds to the content at the current progress status received from the content playback apparatus, and to transmit the related information thus acquired to the terminal apparatus identified with reference to the database.

Yet another embodiment of the present invention relates to an information search method for a system comprising a server and a content playback apparatus that can be connected to the server. The information search method comprises: performing authentication of the propriety of a connection request from the content playback apparatus and a connection request from a display terminal to establish a connection to the server via a network; transmitting, from the content playback apparatus to the server, a progress status of content which is being played back on the content playback apparatus that can be connected to the server via the network, when connection authentication by the server is successful; and searching the database storing the progress status of content and the information related to the content at the current progress status in a mutually associated manner so as to acquire related information that corresponds to the content at the progress status received from the content playback apparatus, and transmitting the information thus acquired to a terminal device identified with reference to a database storing user information with respect to the content playback apparatus and an identifier of the terminal apparatus that differs from the content playback apparatus in a mutually associated manner.

It should be noted that any combination of the aforementioned components or any manifestation thereof may be mutually substituted between a method, apparatus, system, computer program, data structure, recording medium, and so forth, which are effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
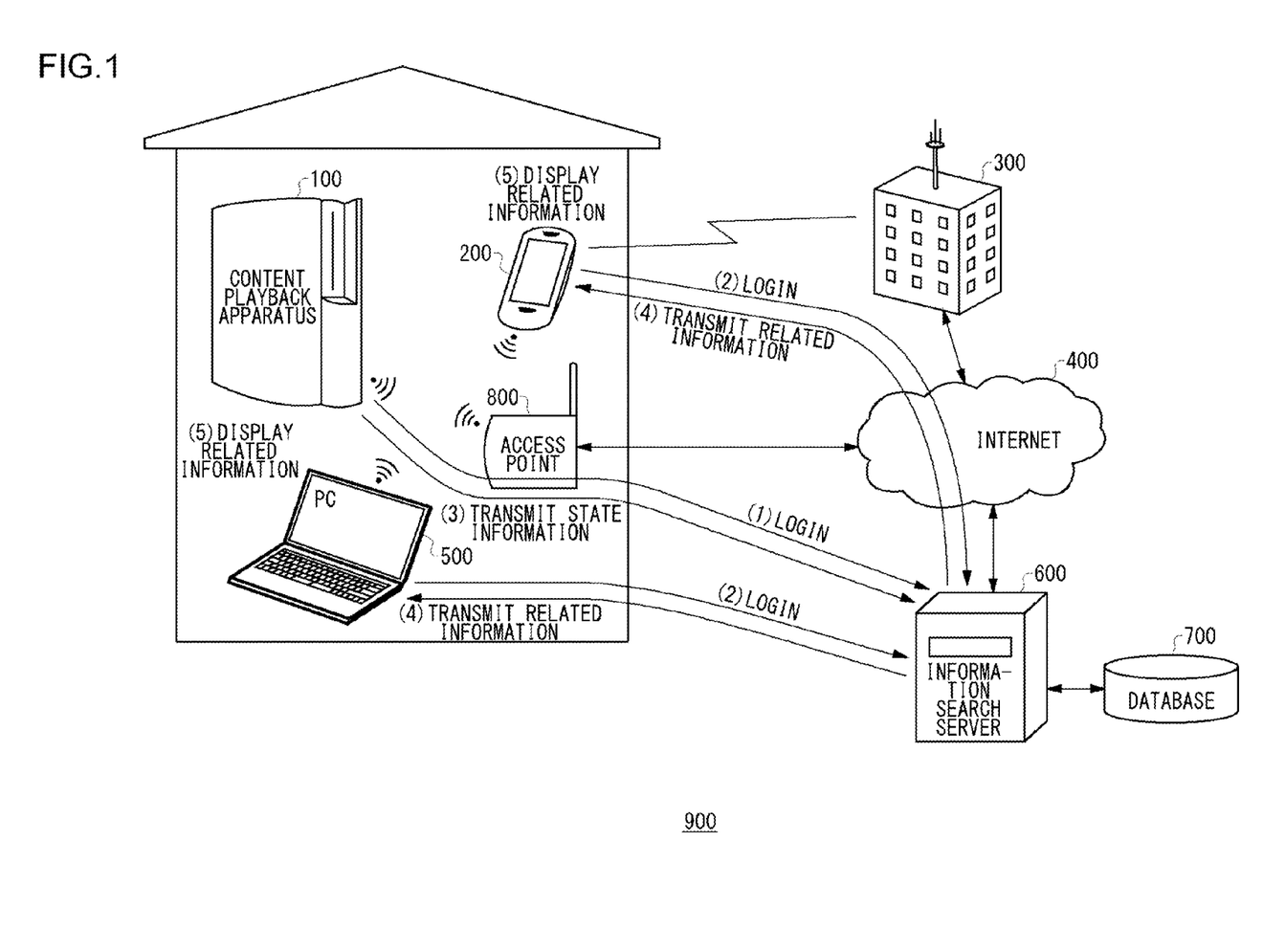
FIG. 1 is a schematic diagram which shows the outline of an information search system according to an embodiment.

FIG. 1 is a schematic diagram which shows the outline of a remote control system 900 according to an embodiment. The remote control system 900 includes: a content playback apparatus 100 configured to play back content such as movies, games, and so forth, and installed in the user's home; a cellular phone terminal 200 configured to establish a connection to an information search server 600 described below via a network; a cellular phone communication network 300; the Internet 400; a PC 500 configured to be capable of establishing a connection to the information search server 600 described below via the network; the information search server 600; a database 700; and an access point 800. Description will be made below regarding the outline of the embodiment with reference to FIG. 1.

(1) The user instructs the content playback apparatus 100 to log in to the information search server 600 via the access point 800 and the Internet 400. (2) Next, the user instructs either of the cellular phone terminal 200 or the PC 500, or otherwise both of them, to log in to the information search server 600. (3) When the information search server 600 authenticates the login request from the content playback apparatus 100, the content playback apparatus 100 transmits, to the information search server 600, the progress status of the content such as a game or the like that is being played back on the content playback apparatus 100. (4) The information search server 600 searches the database 700 so as to acquire the information related to the content such as a game or the like (e.g., a tutorial such as information on how to finish the game or the like), and transmits the search result to the cellular phone terminal 200 or the PC 500.

As described above, such a system is configured to display, on the cellular phone terminal 200 or the like, which is a different terminal from the content playback apparatus 100, such information related to the content that is executed on the content playback apparatus 100. Thus, such a system allows the user to browse the related information without suspending playback of the content, and without interfering with the content which is being played back.

Figure 2:
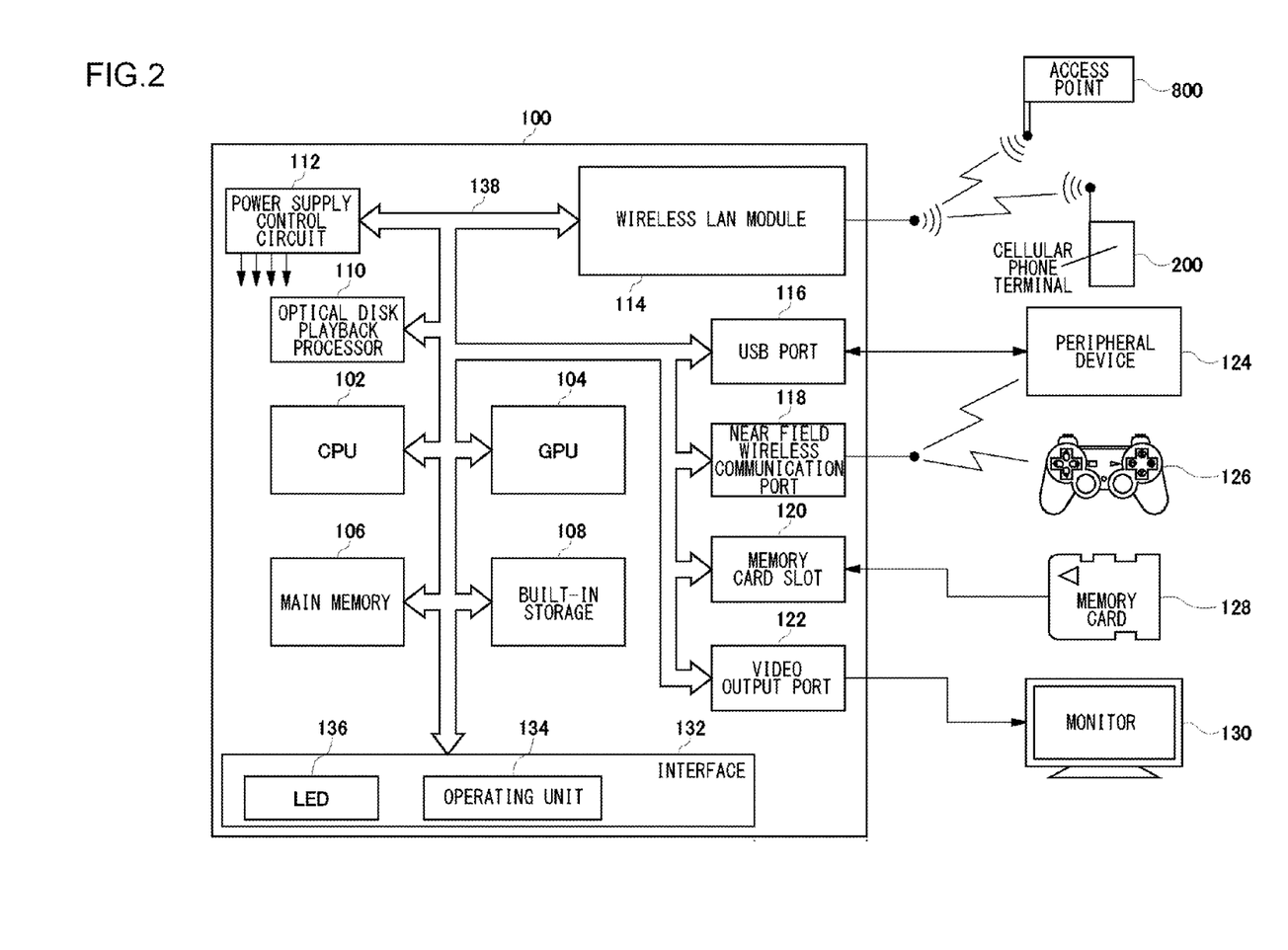
FIG. 2 is a block circuit diagram which shows a schematic configuration of an internal circuit of a content playback apparatus.

FIG. 2 is a block circuit diagram which shows a schematic configuration of an internal circuit of the content playback apparatus 100. The content playback apparatus 100 includes, as its basic components, a CPU (Central Processor Unit) 102, a GPU (Graphic Processor Unit) 104, main memory 106, a built-in storage 108, an optical disk playback processor 110, a power supply control circuit 112, and a wireless LAN module 114.

The CPU 102 is configured to perform signal processing and to control each internal component according to various kinds of application programs for games, e-mail, Web browsing, etc. The GPU 104 is configured to perform image processing. The optical disk playback processor 110 is configured to play back an optical disk such as BD (Blu-ray Disc: trademark), DVD, CD, or the like, on which application programs or multimedia data are recorded, which is inserted via an unshown optical disk playback unit. The main memory 106 functions as a buffer configured to temporarily store data read out from a work area of the CPU 102 or from an optical disk. The wireless LAN module 114 is configured to transmit/receive information to/from a circuit that is external to the content playback apparatus 100.

Furthermore, the content playback apparatus 100 includes a USB port 116, a near field wireless communication port 118, a memory card slot 120, and a video output port 122. The USB port 116 is used to connect a peripheral device 124 such as an external hard disk drive or the like to the content playback apparatus 100. The near field wireless communication port 118 allows the content playback apparatus 100 to be connected wirelessly to the peripheral device 124, and to be connected wirelessly to the controller 126 for the content playback apparatus 100. It should be noted that the controller 126 can be connected to the content playback apparatus 100 via the USB port 116. The memory card slot 120 allows the content playback apparatus 100 to transmit/receive information to/from a detachable memory card 128. The built-in storage 108 is configured to store an application program read out from an optical disk, game save data, or otherwise data such as photo data, video data, music data, etc., acquired via the USB port 116, the near field wireless communication port 118, or the memory card slot 120.

The GPU 104 has a function as a geometry transfer engine configured to perform processing such as coordinate transformation and so forth, and a function as a rendering processor. The GPU 104 is configured to perform a rendering operation according to a rendering instruction received from the CPU 102, and stores the image thus rendered in an unshown frame buffer. That is to say, in a case in which various kinds of application programs recorded on an optical disk employ so-called three-dimensional (3D) graphics as in games, for example, the GPU 104 is configured to perform geometry calculation processing so as to calculate the coordinate points or the like of polygons that are components of a three-dimensional object. Furthermore, in the rendering operation, the GPU 104 is configured to perform calculation for generating an image which can be obtained by acquiring an image of the three-dimensional object using a virtual camera, i.e., to perform perspective transformation (calculation of the coordinate points or the like obtained by projecting the vertexes of each polygon that forms the three-dimensional object onto a virtual camera screen). The image data thus obtained in the final stage of the calculation is written to the frame buffer. The video output port 122 allows a video signal that corresponds to the image generated by the GPU 104 to be output on a monitor 130 such as a TV or the like.

An interface 132 of the content playback apparatus 100 includes an operating unit 134 which allows the user to turn on the power supply, and to eject an optical disk, and LEDs 136 which indicate the on/off state, the access state of each device, and so forth.

These components are mutually connected to each other mainly via a bus line 138. Furthermore, electric power is supplied to each internal circuit of the content playback apparatus 100 from an unshown power supply. It should be noted that the CPU 102 and the GPU 104 are connected to each other via a dedicated bus. Upon turning on the power supply for the content playback apparatus 100 having such a configuration, an operating system program is read out from an unshown mask ROM, and the CPU 102 executes the operating system program. With such an arrangement, the CPU 102 is configured to integrally control each component of the content playback apparatus 100.

When the CPU 102 executes the operating system program, first, the CPU 102 performs an initialization operation such as operation confirmation processing, etc. Subsequently, the CPU 102 reads out an application program such as a game application or the like recorded on the optical disk. After the application program is loaded into the main memory 106, the CPU 102 executes the game application program. By executing the game application program, the CPU 102 is configured to control the GPU 104 and so forth according to an instruction from the user via the controller 126 so as to control a display operation for images, and to control generation of sound effects and musical sound.

Figure 3:
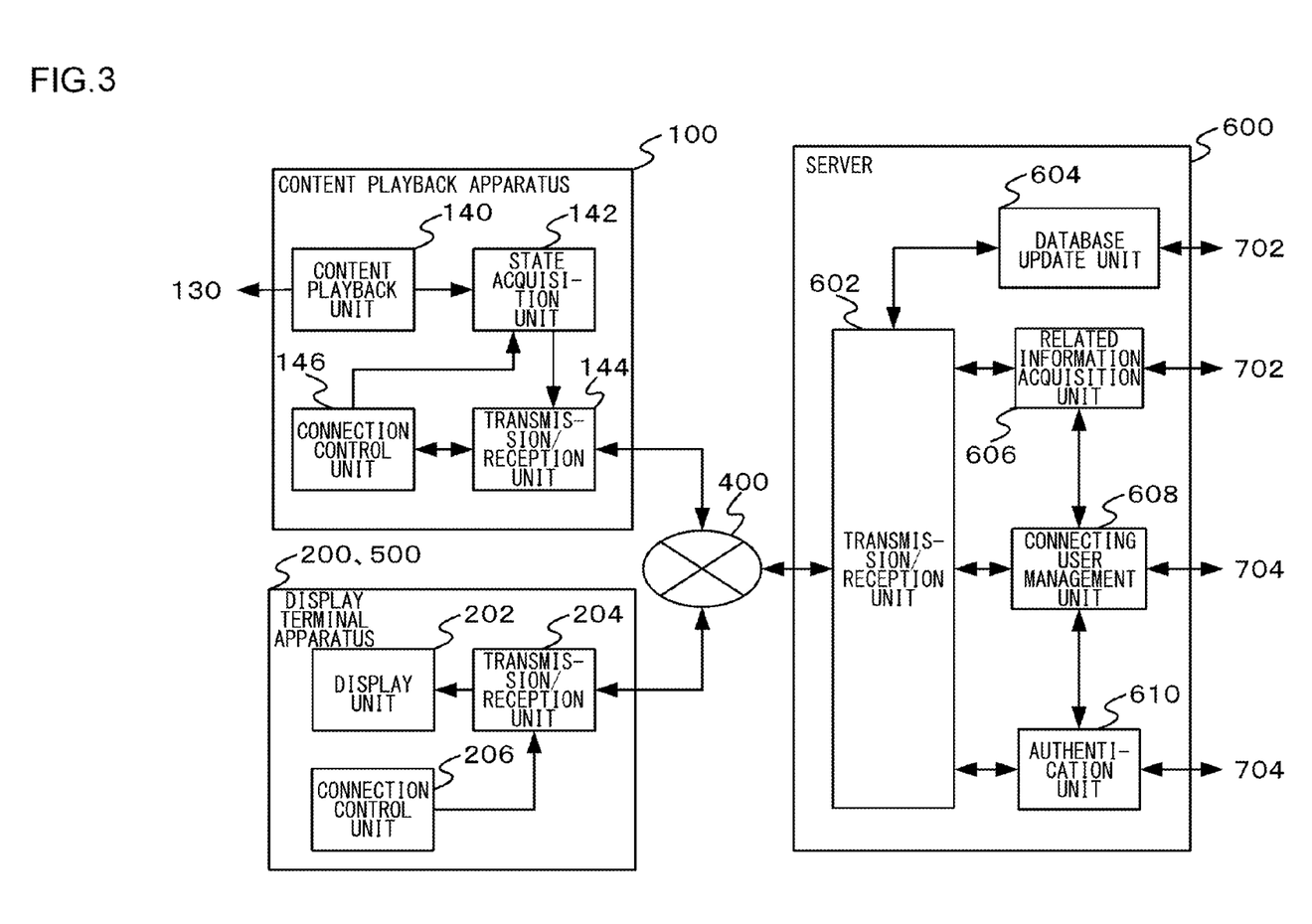
FIG. 3 is a schematic diagram which shows the internal configurations of a content playback apparatus, a display terminal apparatus configured as a cellular phone terminal or a PC, and a server, according to the embodiment.

FIG. 3 is a schematic diagram which shows the internal configurations of the content playback apparatus 100, a display terminal apparatus configured as the cellular phone terminal 200 or otherwise the PC 500, and the information search server 600, according to the embodiment.

The content playback apparatus 100 includes a content playback unit 140, a state acquisition unit 142, a transmission/reception unit 144, and a connection control unit 146.

The content playback unit 140 is configured to play back content such as a game, a movie, or the like. The content playback unit is configured as the CPU 102, the GPU 104, the main memory 106, and so forth, configured to perform processing of the content read out from the built-in storage 108 shown in FIG. 2 or otherwise read out from a BD disc or the like by means of the optical disk playback processor 110. The state acquisition unit 142 is configured to acquire the progress status of the content. For example, in a case in which the content is supplied as a movie, the progress status is configured as a chapter number, a frame number of a moving image of which the movie is formed, or the elapsed playback time with the opening time point of the movie as the start point. On the other hand, in a case in which the content is supplied as a game, the progress status is configured as the game stage, or information with respect to a particular scene in the game story such as a fighting scene with a particular boss character. The state acquisition unit 142 is configured as the CPU 102 configured to execute a program code stored in the built-in storage 108 shown in FIG. 2 so as to acquire the state.

The transmission/reception unit 144 is configured to transmit/receive information to/from the information search server 600 via the Internet 400. The transmission/reception unit 144 is configured as the wireless LAN module 114 shown in FIG. 2. The connection control unit 146 is configured to control a sequence of operations for establishing a connection to the information search server 600 via the transmission/reception unit 144 and the Internet 400. Specifically, the connection control unit 146 is configured to transmit, to the information search server 600, information such as a user name or a password to be used in authentication performed before a connection is established to the information search server 600, the device ID uniquely assigned to each content playback apparatus 100, and so forth. The connection control unit 146 is configured as the CPU 102 shown in FIG. 2 configured to perform rendering of the information acquired from the information search server 600 using a web browser technique.

The information search server 600 includes a transmission/reception unit 602, a database update unit 604, a related information acquisition unit 606, a connecting user management unit 608, and an authentication unit 610.

The transmission/reception unit 602 is configured to transmit/receive information via the Internet 400 to/from the content playback apparatus 100 or otherwise to/from a display terminal apparatus such as the cellular phone terminal 200, the PC 500, or the like. The database update unit 604 is configured to update the information stored in a related information database 702 described later. The related information acquisition unit 606 is configured to search the related information database 702 using the progress status acquired from the state acquisition unit 142 via the Internet 400 as a search key, and to acquire the related information that corresponds to the content at the current progress status.

The authentication unit 610 is configured to perform authentication of the user information acquired from the connection control unit 146 via the Internet 400, with reference to the user information database 704 described later. The connecting user management unit 608 is configured to manage a user device which establishes a connection to the information search server 600 via the Internet 400. Specifically, the connecting user management unit 608 is configured to establish matching between the content playback apparatus 100 and the display terminal apparatus 100 connected to the information search server 600 with reference to the user information database 704. The related information acquisition unit 606 is configured to transmit the related information to the display terminal device.

The display terminal apparatus is configured as either the cellular phone terminal 200 or the PC 500 shown in FIG. 1, or otherwise as both of them. The transmission/reception unit 204 is configured to receive the related information transmitted from the connecting user management unit 608 via the Internet 400. The display unit 202 is configured to display the related information received by the transmission/reception unit 204 on a display device such as a liquid crystal panel or the like. The connection control unit 206 is configured to control a sequence of operations for establishing a connection to the information search server 600 via the transmission/reception unit 144 and the Internet 400, as with the connection control unit 146.

The configuration of the content playback apparatus 100 and the configuration of the information search server 600 may be realized by means of hardware components such as a CPU and memory included in a given computer, or may be realized by means of a program loaded into the memory. However, the drawings each show only functional blocks provided by combining such components. Accordingly, such functional blocks can be realized by hardware components alone, software components alone, or various combinations thereof, which can be readily conceived by those skilled in this art. Examples of such a content playback apparatus 100 include a stationary game machine.

Figure 4:
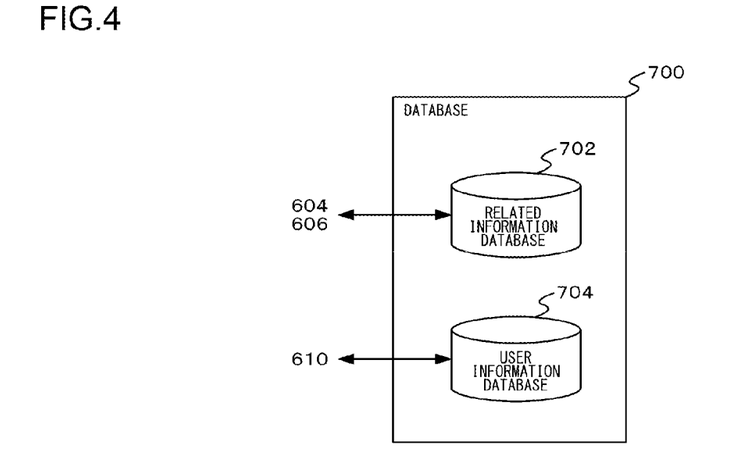
FIG. 4 is a schematic diagram which shows an internal configuration of a database according to the embodiment.

FIG. 4 is a schematic diagram which shows an internal configuration of the database 700 according to the embodiment. The database 700 includes a related information database 702 and a user information database 704.

Figure 5:
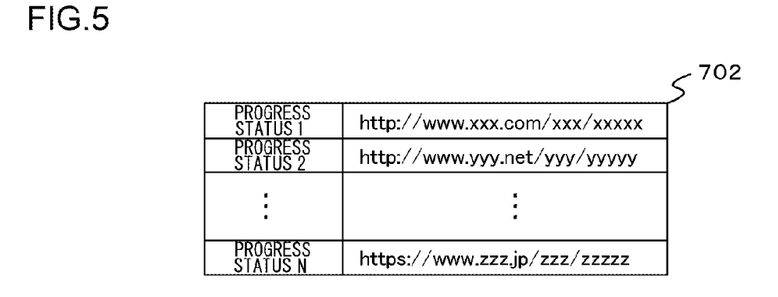
FIG. 5 is a schematic diagram which shows a data structure of a related information database.

The related information database 702 is configured to store the progress status of content and the information related to the content at the progress status in a mutually associated manner. FIG. 5 is a schematic diagram which shows a data structure of the related information database 702. As described above, for example, in a case in which the content is supplied as a movie, the progress status is configured as a chapter number, a frame number of a moving image of which the movie is formed, or the elapsed playback time with the opening time point of the movie as the start point. On the other hand, in a case in which the content is supplied as a game, the progress status is configured as the game stage, or information with respect to a particular scene in the game story such as a fighting scene with a particular boss character. The related information database 702 is configured to store the progress status of content and the corresponding URI (Uniform Resource Identifier) in a mutually associated manner.

The related information that corresponds to the progress status of the movie content is not restricted in particular as long as it relates to the movie progress status. Examples of such related information with respect to the progress status include: information with respect to an actor who appears in a scene that corresponds to the progress status, location information, online stores selling items that appear in the scene, information with respect to a sequel of the movie, and so forth. The URI of a site that provides such information is stored. On the other hand, in a case in which the content is supplied as game content, as the related information that corresponds to the progress status, the related information database 702 stores the URI of a site which provides information on how to finish the game stage, help information, tutorial information, and so forth. In a case in which the content is configured as music content, example of related information thus stored include the URI of a site that provides artist information, the URI of an online store site for PVs (Promotion Videos), and so forth.

The aforementioned database update unit 604 is configured to search for and acquire related information on the Internet 400 using the progress status stored in the related information database 702 as a search key, and to update the information stored in the related information database 702. Furthermore, the database update unit 604 is configured to acquire public information on how to finish a game or the like provided by the game content creator, for example, so as to update the related information database 702. Such an arrangement provides an advantage of providing updated related information with high precision, as compared with an arrangement in which the related information is stored beforehand on a BD disk or the like on which the content has been recorded.

Figure 6:
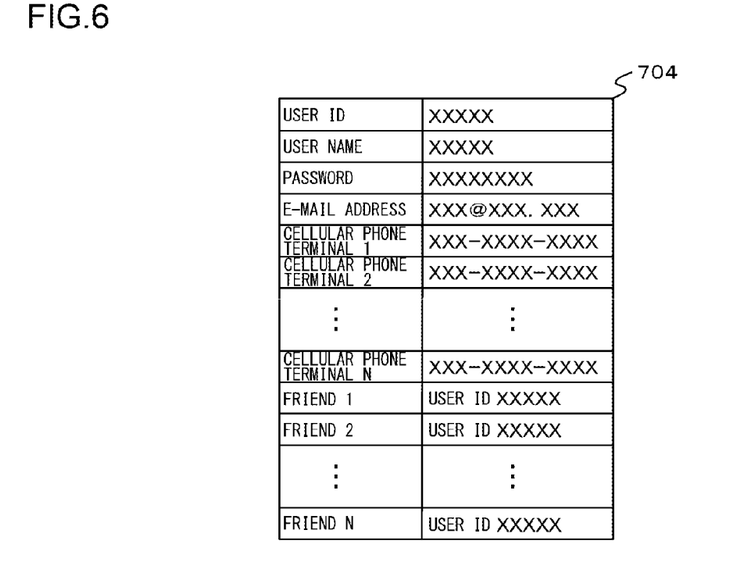
FIG. 6 is a schematic diagram which shows a data structure of a user information database.

The user information database 704 is configured to store the user information with respect to the content playback apparatus, the identifier of the content playback apparatus, and identifiers of terminal devices that are different from the content playback apparatus, in a mutually associated manner. FIG. 6 is a schematic diagram which shows a data structure of the user information database 704. The user information database 704 is configured to store, as a user ID, a user name or an account name which allows the user to be uniquely identified. The user information database 704 is configured to store the user ID, password, e-mail address, and phone numbers of cellular phones 200, in a mutually associated manner.

In a case in which the content is supplied as a game, in some cases, multiple users assemble a team and play the game in cooperation with each other. In such a case, the related information acquired by a user may be made available to the members of the team (friends), which is convenient. Thus, the user information database 704 further stores the user IDs of the friends to whom the related information is to be made available. The connecting user management unit 608 is configured to acquire the user IDs of the friends with reference to the friend information stored in the user information database 704. The related information acquisition unit 606 is configured to transmit the related information to the display terminal apparatuses such as the cellular phone terminals 200 or the like associated with the user IDs acquired by the connecting user management unit 608. Thus, such an arrangement allows the related information to be shared with the friends.

Figure 7:
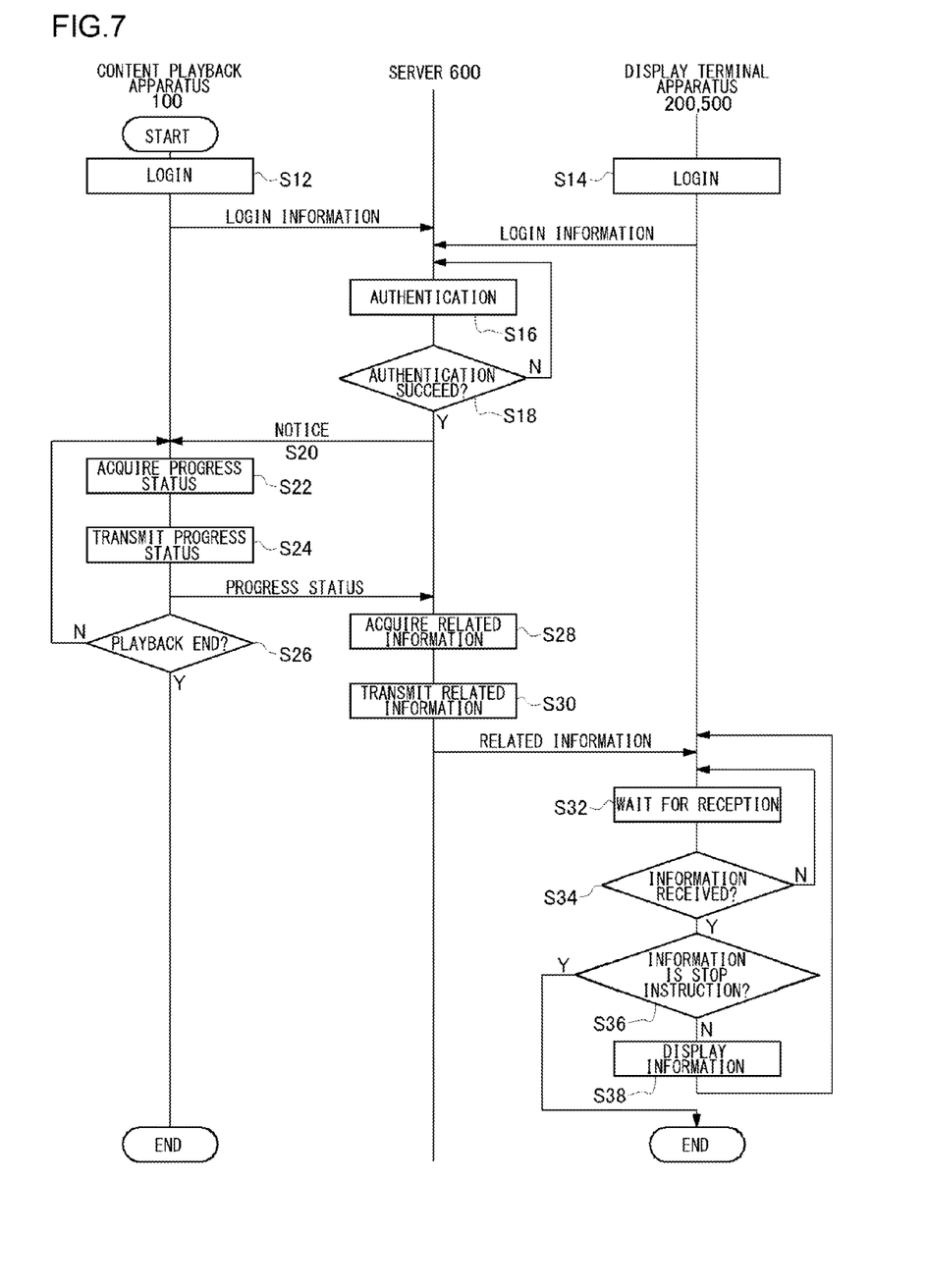
FIG. 7 is a flowchart for describing the flow of the operation of the information search system according to the embodiment.

FIG. 7 is a flowchart for describing the flow of the operation of the remote control system 900 according to the embodiment. In the flowchart shown in FIG. 7, each step of each unit will be indicated by a combination of "S" (which is the initial letter of "Step") which represents "Step" and a number. With such an arrangement, when the judgment result is "true" in a given judgment step represented by a combination of "S" and a number, the judgment result is represented by the addition of "Y" (which is the initial letter of "Yes"). In this case, the judgment result is represented by (Y in S18), for example. Conversely, when the judgment result is "false", the judgment result is represented by the addition of "N" (which is the initial letter of "No"). In this case, the judgment result is represented by (N in S18), for example. The operation shown in this flowchart is started when the user instructs the content playback apparatus 100 to attempt to establish a connection to the information search server 600.

The connection control unit 146 included within the content playback apparatus 100 transmits the user name or password to the information search server 600 so as to attempt to log in to the information search server 600 (S12). Furthermore, the connection control unit 206 included within a display terminal apparatus such as the cellular phone terminal 200, PC 500, or the like, transmits the user name or password to the information search server 600 so as to attempt to log in to the information search server 600 (S14).

The authentication unit 610 included within the information search server 600 performs authentication of a login request based upon the user name and the password received from the connection control unit 146 included within the content playback apparatus 100 and the user name and the password received from the connection control unit 206 included within the display terminal apparatus (S16). When the authentication is not successful (N in S18), the authentication unit 610 notifies the connection control unit 146 included within the content playback apparatus 100 or otherwise the connection control unit 206 included within the display terminal apparatus to that effect, and prompts the user to attempt to log in again. When the authentication is successful (Y in S18), the authentication unit 610 notifies the connection control unit 146 included within the content playback apparatus 100 to that effect (S20).

When the state acquisition unit 142 acquires a notice that authentication of the login from the connection control unit 146 to the information search server 600 is successful, the state acquisition unit 142 acquires the progress status of the content which is being played back on the content playback unit 140 (S22). The state acquisition unit 142 transmits the progress status thus acquired to the information search server 600 (S24). When the content playback operation does not end (N in S26), the state acquisition unit 142 continues to acquire the progress status.

The related information acquisition unit 606 included within the information search server 600 searches the related information database 702 with the progress status of content acquired from the state acquisition unit 142 included within the content playback apparatus 100 as a search key, and acquires the related information that corresponds to the content at the progress status (S28). The connecting user management unit 608 establishes matching between the content playback apparatus 100 and the display terminal apparatus connected to the information search server 600 with reference to the user information database 704, and the related information acquisition unit 606 transmits the related information to the display terminal apparatus (S30).

The transmission/reception unit 204 included within the display terminal apparatus waits for reception of information transmitted from the connecting user management unit 608 included within the information search server 600 (S32). Upon receiving information (Y in S34), when the information is not an instruction to stop the information display operation (N in S36), the display unit 202 displays the information thus received as the related information (S38). During a period of time in which the transmission/reception unit 204 does not receive information from the connecting user management unit 608 (N in S34), the transmission/reception unit 204 continues to wait for information reception. When the information thus received from the connecting user management unit 608 is an instruction to stop the display operation (Y in S36), the display terminal apparatus stops the display operation.

When the content playback operation at the content playback unit 140 included within the content playback apparatus 100 is completed (Y in S26), the operation according to the flowchart ends. It should be noted that, when a predetermined period of time (e.g., 30 minutes) elapses after the last related information is transmitted from the state acquisition unit 142 included within the content playback apparatus 100, the authentication unit 610 automatically performs logoff processing regardless of whether or not there is an explicit logoff instruction to the authentication unit 610 included within the information search server 600, whereby the operation according to the flowchart ends.

Description will be made below regarding the operation of the aforementioned arrangement. The user accesses the information search server 600 via a display terminal apparatus such as the content playback apparatus 100, the cellular phone terminal 200, or the like. The information search server 600 searches for the related information based upon the progress status of content received from the content playback apparatus 100, and transmits the search results to the display terminal apparatus. The display terminal apparatus displays the information which is acquired from the information search server 600, and which is related to the content which is being played back on the content playback apparatus 100. Thus, such an arrangement allows the user to display the content related information on a display device which differs from the device on which the content is being played back.

As described above, the present embodiment provides a technique for allowing the user to browse related information without suspending playback of the content, and without interfering with the content that is being played back.

Description has been made regarding the present invention with reference to the embodiments. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention.

Description has been made above regarding an arrangement in which the related information acquisition unit 606 included within the information search server 600 searches for the related information immediately after it acquires the progress status from the content playback apparatus 100. Also, the related information acquisition unit 606 included within the information search server 600 may be configured to search for the related information after it acquires a predetermined progress status a predetermined number of times or more. Description will be made below regarding such an arrangement.

Figure 8:
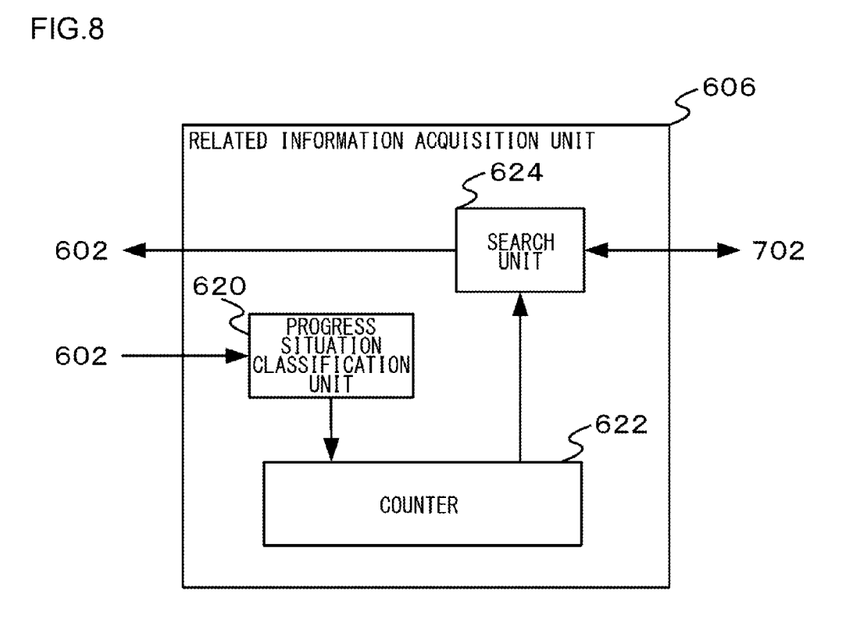
FIG. 8 is a schematic diagram which shows an internal configuration of a related information acquisition unit according to the embodiment.

FIG. 8 is a schematic diagram which shows an internal configuration of the related information acquisition unit 606 included within the information search server 600 according to the embodiment. The related information acquisition unit 606 includes a progress situation classification unit 620, a counter 622, and a search unit 624.

Description will be made with reference to FIG. 8 regarding the related information acquisition unit 606 mainly assuming that it searches for the related information with respect to game content. When the user plays such game content, if information on how to finish the game stage or the like is transmitted to the display terminal apparatus immediately after the user fails to advance the game stage from a certain stage (a fighting stage with a boss character, a puzzle-solving stage, or the like), this detracts from the user's enjoyment of the challenge of the game, in some cases leading to disenchantment with the game. In order to solve such a problem, the progress situation classification unit 620 is configured to classify the game into several stages, and to acquire, as the progress status, the information of whether or not the user reaches a predetermined stage. The counter 622 is configured to count the number of times the user reaches a stage for each of the stages classified by the progress situation classification unit 620. When the number of times the user reaches a given stage, which is counted by the counter 622, exceeds a threshold value that is used to judge whether or not predetermined related information is to be searched for, the search unit 624 searches for the information on how to finish this stage as the related information.

As a specific example, description will be made regarding a case in which the user fights with an enemy character in game content. In general, if the enemy character is a so-called "boss character", the user must clear preparatory stages and challenges involving the boss character several times before the user wins the fighting stage with the boss character. When the progress status classified by the progress situation classification unit 620 is the boss character stage, the counter 622 increments a counter that corresponds to the boss character stage. The search unit 624 is maintained in the standby state in which it does not acquire the related information until the number of times the user reaches the boss character stage exceeds a predetermined number of times (e.g., 10 times) that corresponds to the strength of the boss character. When the count value of the counter 622 exceeds the predetermined number of times the user is to reach the boss character stage, the search unit 624 searches for the related information, and notifies the user of the related information.

Thus, such an arrangement allows the user to take on each game stage a predetermined number of times without involving the information on how to finish the stage. Furthermore, if the user consecutively fails to clear the stage a predetermined number of times, such an arrangement notifies the user of the information on how to finish the stage before the user gets stuck on the stage and loses interest in the game content. Thus, such an arrangement maintains the user's interest in the game, which is an advantage.

Description has been made above regarding an arrangement in which the information acquired by the related information acquisition unit 606 is transmitted to the display terminal apparatus in the form of a URI. Also, in a case in which the cellular phone terminal 200 is used as the display terminal apparatus, such an arrangement may be configured to call the cellular phone terminal 200 via the cellular phone communication network 300 using the phone number acquired from the user information database 704, and to supply the related information by voice. With such an arrangement, the information search server 600 may include an unshown voice synthesizing unit so as to provide a synthesized voice. Such an arrangement provides an advantage of allowing the user to acquire the related information without a need to turn away from the content which is being played back.

Description has been made above regarding an arrangement in which either the cellular phone terminal 200 or the PC 500 is used as the display terminal apparatus. Also, such an arrangement may be configured to allow the user to use a portable game machine which can be communicated with via either the Internet 400 or the cellular phone communication network 300.

What is claimed is:

1. An information search server comprising:
 a database including a table storing a progress status of content, and information related to the content at the progress status in a mutually associated manner, and a table storing user information with respect to a content playback apparatus, an identifier of the content playback apparatus, and an identifier of a terminal apparatus which differs from the content playback apparatus, in a mutually associated manner;
 a connecting user management unit configured to manage the user information with respect to the content playback apparatus connected to the information search server; and
 a related information acquisition unit configured to acquire, via a network, a current progress status of content that is being played back on the content playback apparatus, and to search the database so as to acquire related information that corresponds to the content at the current progress status that is being played back on the content playback apparatus,
 wherein the connecting user management unit is configured to search the database so as to identify the terminal apparatus which is connected to the information search server, and which differs from the content playback apparatus,
 and wherein the related information acquisition unit is configured to transmit the related information to the terminal apparatus identified by the connecting user management unit.

2. An information search server according to claim 1, wherein the content is game content,
 and wherein the related information acquisition unit further comprises: a progress situation classification unit configured to classify the game into several stages, and to acquire, as the current progress status of the content, information of whether or not a player reaches a given stage; and
 a search unit configured to search for tutorial information with respect to a given stage as the related information when the number of times the player reaches the stage exceeds a predetermined threshold to be used for judgment of whether or not related information is to be searched for.

3. A computer-readable recording medium storing a computer program executed by a processor of an information search server, wherein the the computer program comprises:
 a module configured to provide a function for accessing a database including a table storing a progress status of content, and information related to the content at the progress status in a mutually associated manner, and a table storing user information with respect to a content playback apparatus, an identifier of the content playback apparatus, and an identifier of a terminal apparatus which differs from the content playback apparatus, in a mutually associated manner;
 a module configured to provide a function for identifying, with reference to the database, the terminal apparatus connected to the information search server, which differs from the content playback apparatus; and
 a module configured to provide a function for acquiring, via a network, a current progress status of the content that is being played back on the content playback apparatus, to search the database so as to acquire related information that corresponds to the content at the current progress status that is being played back on the content playback apparatus, and to transmit the related information thus acquired to the terminal apparatus.

4. An information search system comprising: a database including a table storing a progress status of content, and information related to the content at the progress status in a mutually associated manner, and a table storing user information with respect to a content playback apparatus, an identifier of the content playback apparatus, and an identifier of a terminal apparatus that differs from the content playback apparatus, in a mutually associated manner;
 a server that can be connected to the database; and
 a content playback apparatus that can be connected to the server via a network,
 wherein the server is configured to authenticate, with reference to the database, the acceptability of a request from the content playback apparatus to establish a connection to the server via the network,
 wherein, when the connection authentication by the server is successful, the content playback apparatus is configured to transmit, to the server, a current progress status of the content that is being played back on the content playback apparatus,
 wherein the server is configured to search the database so as to acquire related information that corresponds to the content at the current progress status received from the content playback apparatus, and to transmit the related information thus acquired to the terminal apparatus identified with reference to the database as a terminal apparatus that differs from the content playback apparatus.

5. An information search method for a system comprising a server and a content playback apparatus that can be connected to the server, the information search method comprising:
 performing authentication of the acceptability of a connection request from the content playback apparatus and a connection request from a display terminal to establish a connection to the server via a network;

transmitting, from the content playback apparatus to the server, a current progress status of content that is being played back on the content playback apparatus, which can be connected to the server via the network, when connection authentication by the server is successful; and searching the database storing a progress status of content and the information related to the content at the progress status in a mutually associated manner so as to acquire related information that corresponds to the content at the current progress status received from the content playback apparatus, and transmitting the information thus acquired to a terminal device identified with reference to a database storing user information with respect to the content playback apparatus and an identifier of the terminal apparatus that differs from the content playback apparatus in a mutually associated manner.

* * * * *